J. KILMER.
Plow-Fender.
No. 46,755. Patented Mar 7, 1865.
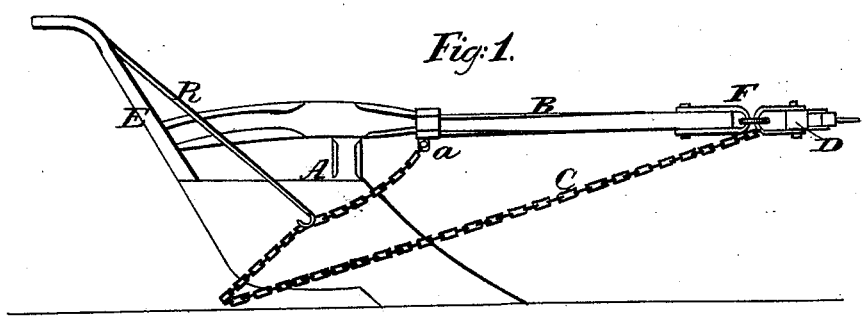
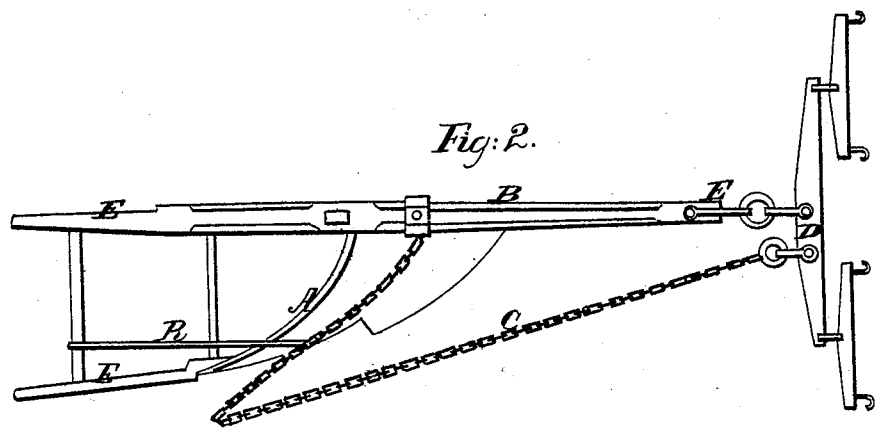
Witnesses:
C. L. Topleff
Theo Tusch
Inventor:
Josiah Kilmer
per Munn & Co
Attorneys

UNITED STATES PATENT OFFICE.

JOSIAH KILMER, OF BARNERVILLE, NEW YORK, ASSIGNOR TO HIMSELF AND AUGS. KILMER.

IMPROVEMENT IN PLOWS.

Specification forming part of Letters Patent No. 46,755, dated March 7, 1865.

*To all whom it may concern:*

Be it known that I, JOSIAH KILMER, of Barnerville, in the county of Schoharie and State of New York, have invented a new and Improved Plow; and I do hereby declare that the following is a full, clear, and exact description thereof, which will enable others skilled in the art to make and use the same, reference being had to the accompanying drawings, forming a part of this specification, in which—

Figure 1 represents a side elevation of this invention. Fig. 2 is a plan or top view of the same.

Similar letters of reference indicate like parts.

This invention relates to an improvement in that class of plows on which a patent has been granted to me December 13, 1864, and in which a drag-chain is used for the purpose of turning under cornstalks, weeds, grass, &c.

The present improvement consists in the application of a regulator, in combination with the drag-chain above referred to, in such a manner that the position of the chain can be adjusted instantaneously according to the force required to throw the stalks, &c., under.

A represents a plow of the ordinary construction, provided with a beam, B, which connects by a clevis, F, with the double-tree or evener D, as clearly shown in the drawings.

The handles E are fastened to the beam and plowshare, as usual, and from the evener or double-tree extends a chain, C, the rear end of which is secured in a staple, *a*, projecting from the under side of the beam, as shown in Fig. 1 of the drawings. This chain drags on the ground, and it is intended to turn under cornstalks, weeds, grass, &c. In order to adjust its force a regulator, R, is applied, which consists of a bar of iron or other metal fastened at one end to one of the rounds which connect the handle, and provided at the other end with a hook which is made to catch in the links of the chain. Instead of the iron bar, however, a simple rope or chain can be used; and I do not wish to confine myself to the exact form of the regulator shown in the drawings, but I reserve the right to use whatever material or device I may find desirable for this purpose.

By adjusting the regulator in different links of the drag-chain closer to or farther from the staple *a* the force exerted by the chain can be adapted to the work to be accomplished, so that the same will not ride over the weeds or stalks, and will never fail to turn the same under the plow.

By the application of this regulator the use of the drag-chain is rendered much more valuable than it was before, and my plow can be be used for soil of different kinds with great advantage.

The drag chain C being already secured in my patent of December 13, 1864, I do not claim novelty therein; but

What I claim as new, and desire to secure by Letters Patent, is—

A regulator, R, to be employed in combination with the drag-chain C, in the manner and for the purposes set forth.

JOSIAH KILMER.

Witnesses:
M. M. LIVINGSTON,
C. L. TOPLIFF.